United States Patent
Blatter et al.

(10) Patent No.: US 8,321,056 B2
(45) Date of Patent: Nov. 27, 2012

(54) POWER PLANT WITH $CO_2$ CAPTURE AND COMPRESSION

(75) Inventors: Richard Blatter, Schaffhausen (CH); Olivier Drenik, Belfort (FR); Holger Nagel, Stuttgart (DE)

(73) Assignee: Alstom Technology Ltd, Baden (CH)

( * ) Notice: Subject to any disclaimer, the term of this patent is extended or adjusted under 35 U.S.C. 154(b) by 177 days.

(21) Appl. No.: 12/834,505

(22) Filed: Jul. 12, 2010

(65) Prior Publication Data

US 2011/0048015 A1   Mar. 3, 2011

Related U.S. Application Data

(63) Continuation of application No. PCT/EP2009/050205, filed on Jan. 9, 2009.

(30) Foreign Application Priority Data

Jan. 11, 2008 (EP) .................................. 08100390

(51) Int. Cl.
*G05B 13/00* (2006.01)
*B01D 53/34* (2006.01)
*F01K 17/00* (2006.01)

(52) U.S. Cl. ...... 700/274; 700/266; 60/39.53; 60/39.55; 60/685; 60/686; 422/168

(58) Field of Classification Search ................. None
See application file for complete search history.

(56) References Cited

U.S. PATENT DOCUMENTS 6,196,000 B1  3/2001  Fassbender
2003/0131582 A1  7/2003  Anderson et al.

FOREIGN PATENT DOCUMENTS

| DE | 36 32 041 A1 | 4/1987 |
| EP | 0 537 593 A1 | 4/1993 |
| EP | 0 858 153 A1 | 8/1998 |
| EP | 1 688 173 A2 | 8/2006 |
| WO | WO 2007/073201 A1 | 6/2007 |
| WO | WO 2008/090167 A1 | 7/2008 |

OTHER PUBLICATIONS

European Search Report for EP 08100390.7 dated Mar. 24, 2009.
R. Ackenheil et al., "Primary Frequency Control for Combined Cycle Power Plants", VGB PowerTech, Jan. 1, 2006, pp. 76-78, vol. 86, No. 3.

*Primary Examiner* — Neil N Turk
(74) *Attorney, Agent, or Firm* — Buchanan Ingersoll & Rooney PC

(57) ABSTRACT

A power plant frequency response characteristic is implemented by controlling the power consumption of a $CO_2$ capture and compression system. A power reserve is provided for under-frequency events without deloading the plant to part load, by an operating method, in which the power consumption of the $CO_2$ capture system is used to control the net output of the plant.

20 Claims, 2 Drawing Sheets

POWER PLANT WITH $CO_2$ CAPTURE AND COMPRESSION

RELATED APPLICATIONS

This application claims priority as a continuation application under 35 U.S.C. §120 to PCT/EP2009/050205, which was filed as an International Application on Jan. 9, 2009 designating the U.S., and which claims priority to European Application 08100390.7 filed in Europe on Jan. 11, 2008. The entire contents of these applications are hereby incorporated by reference in their entireties.

FIELD

The disclosure relates to power plants with $CO_2$ capture and compression as well as their operation during frequency response.

BACKGROUND INFORMATION

In recent years it has been stated that generation of greenhouse gases leads to global warming and that further increase in greenhouse gas production will further accelerate global warming. Since $CO_2$ (carbon dioxide) is identified as a main greenhouse gas, CCS (carbon capture and storage) is considered one potential major ways to reduce the release of greenhouse gases into the atmosphere and to control global warming. In this context CCS can be defined as the process of $CO_2$ capture, compression, transport and storage. Capture can be defined as a process in which $CO_2$ is removed either from the flue gases after combustion of a carbon based fuel or the removal and processing of carbon before combustion. Regeneration of any absorbents, adsorbents or other ways to remove $CO_2$ of carbon from a flue gas or fuel gas flow is considered to be part of the capture process. There are several possible approaches to $CO_2$ capture in power plants, e.g. in coal fired steam power plants, gas turbine or combined cycle power plants. The main technologies under discussion for $CO_2$ capture are so called pre-combustion capture, oxyfiring, chemical looping and post-combustion capture.

Pre-combustion carbon capture involves the removal of all or part of the carbon content of a fuel before burning it. For natural gas, this can be done by reforming it with steam, followed by a shift reaction to produce $CO_2$ and hydrogen. The $CO_2$ can be captured and removed from the resulting gas mixture. The hydrogen can then be used to produce useful energy. The process is also known as synthesis gas or syngas approach. The same approach can be used for coal or any fossil fuel. First the fuel is gasified and then treated in the same way as natural gas. Applications of this approach in combination with IGCC (Integrated Gasification Combined Cycle) can be envisioned.

Oxyfiring (also known as oxyfuel firing or oxygen combustion) is a technology that burns coal or other fossil fuel in a mixture of oxygen and recirculated $CO_2$ rather than air. It produces a flue gas of concentrated $CO_2$ and steam. From this, $CO_2$ can be separated simply by condensing the water vapor, which is the second product of the combustion reaction.

Chemical looping involves the use of a metal oxide as an oxygen carrier, typically a metal oxide, which transfers oxygen from the combustion air to the fuel. Products from combustion are $CO_2$, reduced metal oxide and steam. After condensation of the water vapor, the $CO_2$ stream can be compressed for transportation and storage.

The CCS technology currently considered closest to large-scale industrial application is post combustion capture combined with compression, transportation and storage. In post-combustion capture the $CO_2$ can be removed from a flue gas. The remaining flue gas can be released to the atmosphere and the $CO_2$ can be compressed for transportation and storage. There are several technologies known to remove $CO_2$ from a flue gas such as absorption, adsorption, membrane separation, and cryogenic separation.

Known technologies for $CO_2$ capture and compression can involve relatively large amounts of energy. There are many publications on the optimization of the different processes and the reduction of the power and efficiency penalty by integrating these processes into a power plant.

For CCS with post combustion capture, the $CO_2$ capture and the compression of $CO_2$ for further processing, i.e. transport and storage, can lead to a decrease in the net power output reduction of a plant relative to a known plant without CCS.

EP1688173 gives an example for a post combustion capture and a method for the reduction of power output penalties due to $CO_2$ absorption, respectively the regeneration of the absorption liquid. Here it is proposed to extract steam for regeneration of the absorbent from different stages of the steam turbine of a power plant to minimize a reduction in a turbine output.

In the same context, WO2007/073201 suggests to use the compression heat, which results from compressing the $CO_2$ stream for regeneration of the absorbent.

These methods aim to reduce the power requirements of specific $CO_2$ capture equipment, however the use of the proposed $CO_2$ capturing method will always result in a significant reduction of the plant capacity, i.e. the maximum power a plant can deliver to the grid.

An attempt to mitigate the impact of $CO_2$ capture on the plant performance by increasing plant flexibility is disclosed in EP0537593. EP0537593 discloses a power plant that utilizes an absorbent for $CO_2$ capture from the flue gases, where the regenerator can be switched off during times of high power demand and where the $CO_2$ capture continues by use of absorbent stored in an absorbent tank during these times. EP0537593 discloses a simple on/off mode of one power consumer of the $CO_2$ capture equipment. It adds only very little operational flexibility at relatively high cost.

Frequency response is an important issue for power plant operation and also has to be considered for plants with $CO_2$ capture and compression. EP0858153 discloses basic principles of frequency response, in which a grid has a grid frequency, which fluctuates around a nominal frequency. The power output of the power plant can be controlled as a function of a control frequency, in such a matter that the power output can be increased when the control frequency decreases below the nominal frequency, and the power output can be decreased when the control frequency increases beyond the nominal frequency. The grid frequency can be continuously measured. EP0858153 discloses a method to average the grid frequency and to use the measured grid frequency as the control frequency, however it is limited to known control mechanisms of a gas turbine power output control. To enable response to under-frequency events, plant normally have to operate at part load.

SUMMARY

A method is disclosed for operating a power plant, comprising operating a plant via a control system and $CO_2$ capture system; and using a power consumption of the $CO_2$ capture system as a control parameter for controlling net power output during an under-frequency event.

A power plant is disclosed comprising a $CO_2$ capture system and a control system that uses a power consumption of the $CO_2$ capture system as a control parameter for controlling net power output during an under-frequency event.

BRIEF DESCRIPTION OF THE DRAWINGS

The disclosure, its nature as well as its advantages, shall be described in more detail below with the aid of the accompanying drawings, wherein.

DETAILED DESCRIPTION

Figure 1:
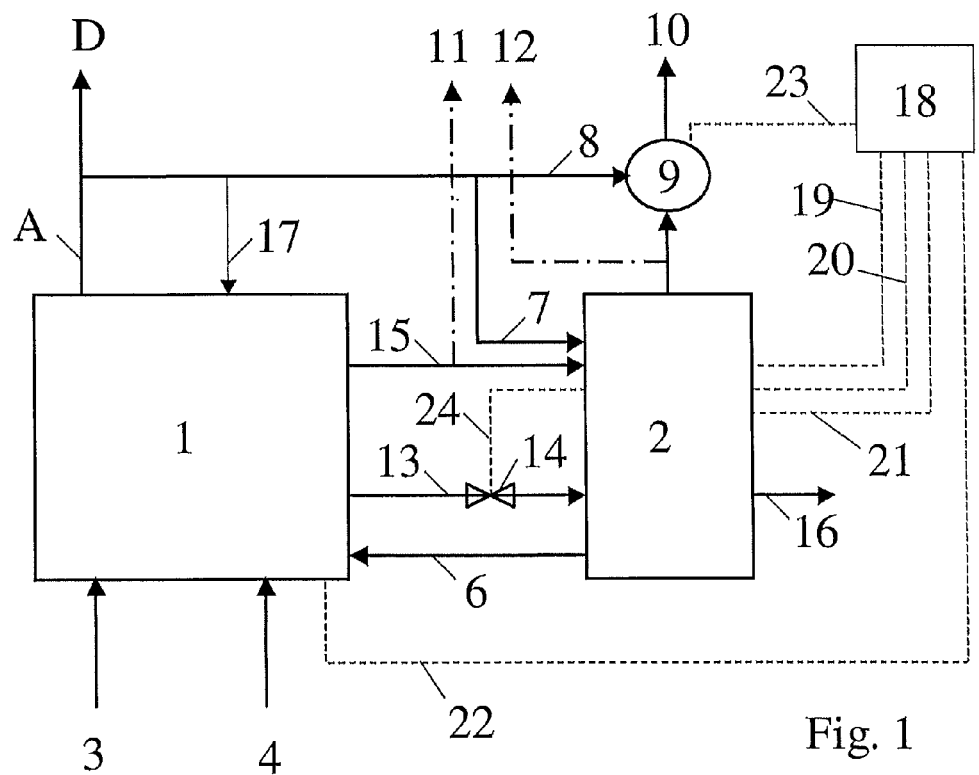
FIG. 1 is a schematic view of an exemplary power plant with $CO_2$ capture and compression.

The present disclosure relates to frequency response operating methods for power plants with $CO_2$ capture and compression, and to a power plants with a $CO_2$ capture and compression system designed to operate according to the operating methods.

CCS (carbon capture and storage) can be used to increase the flexibility of the plant and therefore increase its competitiveness to known plants without $CO_2$ capture. According to the disclosure the power consumption of an exemplary $CO_2$ capture system can be used as a control parameter for the net power output of a power plant during an under-frequency event. In this context the electrical power consumption, mechanical power consumption, for example, in direct $CO_2$ compressor drives, and consumption of live steam, which otherwise can be converted into electrical energy in a steam turbine, can be considered as power consumption of the capture system. An under-frequency event, which is often also called under-frequency excursion or low frequency event, is a reduction in a power grid's frequency below the nominal frequency. In particular the frequency response capability of the plant can be improved by using fast variations of $CO_2$ capture and compression equipment power consumption to modify the electric power the plant can deliver to the power grid during an under-frequency event.

In an exemplary plant operating method, the power consumption of the exemplary $CO_2$ capture system can be reduced or the system can be shut down to increase the net output of the plant as a reaction to a drop in the grid frequency. In the context of this disclosure, a $CO_2$ capture system can be defined as the entire $CO_2$ capture unit plus the compression unit with all their auxiliaries. This operating method can give additional flexibility in addition to the existing control of the plant. Due to the integration of the exemplary $CO_2$ system into the power plant with this method, the net output of the plant can be increased at a high rate during an under-frequency event and no part load operation may be required to assure net power capacity for frequency response. High rate power variations can be realized by fast gradients in the power consumption of the $CO_2$ capture system. The plant can therefore operate with optimum efficiency at or close to base load. This disclosure can be realized at no or very little additional cost.

In a known plant, the net output of the plant can be increased in response to an under-frequency event by increasing the gross power output of a plant and by decreasing the auxiliary or parasitic power consumption of the plant and any of its systems. The increase in gross power output can be limited to base load of the plant. Further, the rate at which the gross power of a plant can be increased can be limited due to thermal stresses, which occur during transients and inertia of the plant. In a known plant the possibilities to decrease parasitic power consumption of any system or auxiliaries can also be limited. The biggest consumers for a steam or combined cycle power plant can be the feed water pumps, cooling water pumps and cooling equipment, which cannot be switched off during continuous operation.

The large power consumption of $CO_2$ capture and compression, which are not involved in safe continuous operation of the plant, change the situation and give new possibilities for fast transient changes in net power without encountering limitations on the plant. In effect the power consumption of the exemplary $CO_2$ capture system can be used as a control parameter for the plant's net power output. For example, the power consumption for $CO_2$ capture and compression can be changed and this power can be used to meet the frequency response requirements of a power grid. Further, lifetime consuming fast load transients of the plant in response to under-frequency events can be avoided or reduced with this new concept as changes in net power output are met by a control of the power consumption of the exemplary $CO_2$ capture system.

A frequency response with $CO_2$ capture and compression can avoid derated operation of the plant, which might occur with the grid if no more capacity for frequency reserve is available. Depending on the grid some plants might operate at part load, for example 90% load in order to keep a power reserve for under-frequency events. Operation at 90% can lead to reduced efficiency and increases the capital and operational cost per MWh produced. The features of the present disclosure can allow a plant to operate at or close to base load with optimum efficiency and still have an inherent power reserve for under-frequency events as the power consumption of the exemplary $CO_2$ capture system can be switched off and used for frequency response.

In an exemplary approach using the exemplary $CO_2$ capture system as a control parameter for the net power output, the $CO_2$ capture and $CO_2$ compression equipment or its main power consumers can simply be switched off during an under-frequency event. The $CO_2$ separation, independent of chosen technology, can be stopped and the plant can running like a known plant with $CO_2$ emissions in the flue gases. Correspondingly, no $CO_2$ compression with its parasitic power demand is required.

Besides simply stopping or even tripping the $CO_2$ capture and compression unit, a deloading to reduced capacity or part load operation of the $CO_2$ capture equipment and compression can be used for frequency response operation. Reduced capacity can be realized by operating at least one of the exemplary $CO_2$ capture system's components below the capacity required to reach the nominal $CO_2$ capture rate. As a consequence the capture rate can be reduced during frequency response.

Because under-frequency events occur only very seldom and over a short period of time, the accumulated amount of $CO_2$ not captured due to this operation mode can be small and can be neglected. Depending on the grid, under-frequency events, which would lead to such a short term $CO_2$ emission occur only once in several years and will only last for a few minutes or a couple of dozen minutes.

However, flexible operation of the capture equipment and compression unit can increase the competitiveness of power plants with $CO_2$ capture and compression. It can therefore allow earlier introduction of this kind of plant beyond mere pilot plant projects into a competitive power market and in consequence can reduce the $CO_2$ emissions.

In the following, an exemplary method for frequency support with $CO_2$ capture and compression is discussed using the example of $CO_2$ absorption. This method and all its variants described in the following can be equally applicable for a $CO_2$ capture method, which includes $CO_2$ adsorption, regeneration of the adsorbent and compression of captured $CO_2$. Frequency response operation using the same principle can be implemented for all $CO_2$ capture methods.

Operation of an exemplary $CO_2$ capture and compression process, which includes $CO_2$ absorption, regeneration of the absorbent and compression of captured $CO_2$ can give three main options to increase the flexibility of the plant operation. They can be performed one by one or all at the same time. They are:

1. Shut down or operation at reduced capacity of $CO_2$ compression unit;
2. Shut down or operation at reduced capacity of regeneration unit; and
3. Shut down or operation at reduced capacity of absorption unit While the first option can lead to a significant reduction in parasitic power consumption, it can lead to a release of $CO_2$ to the atmosphere within a very short time period as large volumes of uncompressed $CO_2$ cannot be stored economically. Therefore part or all the captured $CO_2$ can for example be released via a bypass of the $CO_2$ compression unit during an under-frequency event. For a safe disposal of the captured $CO_2$ it can, for example, be mixed with the flue gases downstream of the $CO_2$ absorption unit and released via the stack of the power plant.

A further reduction in parasitic power consumption can be realized by the second option. Regeneration can be done by "re-boiling" of the absorbent, which means heating the absorbent by steam in order to release the $CO_2$. In consequence the steam is no longer available for power production. Once the regeneration is stopped during frequency response operation, the steam can be available for power production.

A third option, in which also the absorption process can be stopped or operated at reduced capacity, leads to further reduction in auxiliary power consumption. This reduction in power consumption can be significantly smaller than the savings achieved in the first two options. Depending on the design of the absorption unit, a part of or all the flue gas can be bypassed around the capture equipment during this operation mode.

Operation of the absorption process itself does not make any sense without further measures, as the absorbent in known arrangements will be saturated quickly and cannot capture any more $CO_2$. However, depending on the size of absorbent storage tanks $CO_2$ capture without regeneration and $CO_2$ compression can be possible for a limited period of time.

As a trip of the $CO_2$ capture and compression method faster and safer than a deloading of the systems, a combination of a trip of at least one part of the system with the plant load control is proposed. If at least one part of the system is tripped, the resulting net power output increase can be higher than required for the frequency response. In this case the gross power output of the plant can be reduced using known plant control to assure the correct net power output required by the grid.

Besides shut down of an exemplary $CO_2$ capture system's components, their part load operation can be possible. For example, the mass flow of the $CO_2$ compression unit can be reduced by control means such as inlet guide vanes. In case of a compression unit including two or more parallel compressor trains, the shut down of at least one compressor can lead to a reduction of the $CO_2$ compression unit's power consumption. In case of two parallel compressor trains operating at full capacity, shut down of one compressor train would lead to a reduction in power consumption by 50% but also implies that 50% of the captured $CO_2$ cannot be compressed and can be bypassed to the stack. Alternatively the resorption rate can be reduced. This can, for example, be realized by reducing the flow of absorbent through the regeneration unit and bypassing the remaining flow and mixing the two flows before they enter the absorption unit. As only part of the flow passes through the regeneration unit, the steam used for regeneration can be reduced and the surplus steam can be used for power production. As a consequence of mixing regenerated with unregenerated absorbent, the capacity of the resulting mixture to absorb $CO_2$ can be reduced and a lower percentage of $CO_2$ can be captured from the flue gases and less $CO_2$ can be released for compression in the regeneration unit. As it may not be economical to first capture $CO_2$ and then bypass it, a simultaneous reduction in the capacity of all capture systems components is proposed.

Another possibility to operate the absorption unit without regeneration or regeneration at reduced capacity of absorbent during an under-frequency event is to use stored absorbent for $CO_2$ during this time.

If a critical grid situation occurs, a signal from the dispatch center can start the above described reduction in power consumption of the exemplary $CO_2$ capture system before the frequency drops under a critical threshold and therefore help to stabilize the grid.

Different control methods for operation of the exemplary $CO_2$ capture system are possible. One example is an open loop control of the different components of the exemplary $CO_2$ capture system. This can be suitable in the case that only on/off control of the different components is used.

An open loop control operating process in which a continuous control of the power consumption of the exemplary $CO_2$ capture system, i.e. without sudden steps in the power output due to on/off switching of different components, can be realized. In this example continuous control of the power consumption of the exemplary $CO_2$ capture system can be realized by the variation of one component's power consumption at a time, while the remaining components operate at constant load. However, closed loop control can be advantageous for example for transient operation or operation under changing boundary conditions.

In case that operation at reduced capacity of the different components is foreseen, a closed loop control can allow better optimization of the load distribution. This can be useful if a control of the $CO_2$ capture rate is implemented. In this case the power consumption of the exemplary $CO_2$ capture system is not varied by the control of one single component at a time, while the remaining components operate at constant load. The reduction in capacity of the different components has to be coordinated. For this, a feed back of the current operating conditions of each component can be desirable and a closed loop control is useful.

A further subject of this disclosure is a thermal power plant for the combustion of carbon-based fuels with an exemplary $CO_2$ capture system, which is designed for operation according to the frequency response method described above. The corresponding $CO_2$ capture system can enable fast system deloading.

One exemplary embodiment of the disclosure is a power plant burning a carbon-based fuel, which has at least one flue gas stream. An exemplary plant in accordance with the present disclosure can include, in addition to known components for power generation, a $CO_2$ capture unit for removing $CO_2$ from the flue gas stream, and a $CO_2$ compression unit. The capture unit can include capture equipment, in which the $CO_2$ can be removed from the flue gas, a regeneration unit, in which the $CO_2$ can be released from the absorbent, adsorbent or other means to bind the $CO_2$ from the flue gas, and a treatment system for conditioning the $CO_2$ for transportation. The compression unit can include at least one compressor for $CO_2$ compression. The compression unit can include at least one cooler or heat exchanger for re-cooling compressed $CO_2$ during and/or after the compression.

To allow operation according to the proposed operating concept, a steam turbine of the plant can convert the maximum steam flow into energy, which can be produced by the plant with the $CO_2$ capture system switched off.

In a further exemplary embodiment, the generator and electrical systems can be designed to convert the maximum power, which is produced with the $CO_2$ capture system off, into electrical power and to transmit this electric power to the grid.

In order to facilitate the above described operation of such a plant, it can include a bypass of the $CO_2$ compressor, which can safely vent the $CO_2$, and for example leads into the flue gas stack downstream of the $CO_2$ capture device.

In a further exemplary embodiment, the $CO_2$ capture unit can be designed to withstand the flue gases even when it is not in operation, for example an absorption unit, which is designed to run dry.

Alternatively a bypass of the $CO_2$ capture unit can be foreseen, which can allow operation of the power plant independent of the $CO_2$ capture unit. This bypass can also be useful for start-up or shut down of the plant as well as for plant operation during maintenance of the $CO_2$ capture system.

In a further exemplary embodiment, a storage tank dimensioned to supply $CO_2$ absorbent for a defined period of time can be provided, which can allow continuous $CO_2$ capture even when the $CO_2$ compression and resorption are off during an under-frequency event.

As the exemplary $CO_2$ capture systems can be a complex system and an appropriate control system is required as discussed for the different exemplary operating methods above. This exemplary control system depends on and affects the power control of the plant. As the power control is an essential part of the plant control system it is desirable to integrate the control of the $CO_2$ capture system into plant control system or to coordinate the control of the $CO_2$ capture system by the plant control system and to connect all the relevant data lines to the plant control system. If the plant includes several units and the plant control system has a hierarchical structure consisting of plant controller and unit master controllers, it is desirable to realize such an integration or coordination of the $CO_2$ capture system's control into each units' master controller.

Alternatively the exemplary $CO_2$ capture system can have its own controller, which can be connected to the plant control system via a direct data link. The plant control system or the unit master controller has to send at least one signal to the controller of the $CO_2$ capture plant. This signal can for example be a commanded power consumption signal or a commanded capture rate.

In the above-described cases, the $CO_2$ capture controller is not necessarily one hardware device but can be decentralized into drive and group controllers coordinated by one or more control units.

In case the control of the exemplary $CO_2$ capture system is coordinated by the plant control system, the high-level control unit can, for example, send the total commanded mass flow to the $CO_2$ compression unit's group controller and receive the total actual mass flow as input from this group controller. The compression unit in this example can contain several compressor trains. Each of the compressor trains has its own device controller. The group controller can have an algorithm to decide how to best distribute the commanded total $CO_2$ compression mass flow on the different compressor trains and sends a commanded mass flow to each individual compressor train's device controller. In return, the group controller gets the actual $CO_2$ compression mass flow of each compressor train. Each compressor train device controller can again work with depended controllers on lower levels.

The same kind of hierarchy can be applied to the control of all components of the exemplary $CO_2$ capture system.

A power plant for execution of the proposed method can include a known power plant 1 plus a $CO_2$ capture unit 2 and a $CO_2$ compression unit 9.

An exemplary arrangement with post combustion capture is shown in FIG. 1. The power plant 1 is supplied with air 3 and fuel 4. Its main outputs are the plant gross electric power A and flue gas 15. Further, steam is extracted from the plant 1 and supplied via the steam line 13 and the steam control valve 14 to the $CO_2$ capture unit 2. The steam can be returned to the plant 1 at reduced temperature or as condensate via the return line 6 where it is reintroduced into the steam cycle. A $CO_2$ capture unit 2 can include a $CO_2$ absorption unit, in which $CO_2$ can be removed from the flue gas by an absorbent, and a regeneration unit, in which the $CO_2$ can be released from the absorbent. Depending on the temperature of the flue gas and the operating temperature range of the $CO_2$ absorption unit, a flue gas cooler can also be desired.

The $CO_2$ depleted flue gas 16 can be released from the $CO_2$ capture unit to a stack. In case the $CO_2$ capture unit 2 is not operating, it can be bypassed via the flue gas bypass 11.

In normal operation the captured $CO_2$ will be compressed in the $CO_2$ compressor 9, and the compressed $CO_2$ 10 will be forwarded for storage or further treatment.

Electric power 7 is required to drive auxiliaries of the $CO_2$ capture unit 2, and electric power 8 can be used to drive the $CO_2$ compression unit 9. The net power output D to the grid is therefore the gross plant output A reduced by the electric power for plant auxiliaries 17, reduced by the electric power for $CO_2$ compression unit 8, and by the electric power for the $CO_2$ capture unit 7.

The corresponding control unit 18, which can integrate the control of the additional components needed for the $CO_2$ capture and compression with the control of the power plant is also depicted in FIG. 1. The control unit 18 has the required at least one control signal line 22 with the power plant 1, and at least one control signal line with the $CO_2$ compression unit 9. Further, the at least one control signal line 19 with the $CO_2$ capture unit 2 including the flue gas bypass 11 is indicated. In case the capture unit 2 is based on absorption or adsorption, a regeneration unit is part of the system and correspondingly at least one signal line 20 to the regeneration unit can be desired. If the capture unit 2 also includes at least one storage tank for an adsorbent/absorbent, control signal lines $_2$1 to the storage system can be desired. For the example shown, in which steam 13 is used for regeneration, the steam control valve $_24$ can be controlled via the control signal lines $_24$. This control line can be connected to the resorption unit, which is part of the capture unit $_2$, or directly to the control system 18.

The control of net power D is explained using two examples, in which an increase in net power output D is required for frequency response starting from an operating point where all components operate at full capacity:

In a simple approach the net output D can first be increased by a controlled reduction in the power consumption of the $CO_2$ compressor unit 9. As the power consumption of the compressor unit 9 is reduced, the amount of $CO_2$ released from the $CO_2$ regeneration unit 2 can stay constant. As a consequence, part of the $CO_2$ flow has to bypass the $CO_2$ compressor unit through the $CO_2$ compression unit bypass 12. Once the $CO_2$ compressor unit 9 is completely switched off, the net output D can be increased by a controlled reduction in the power consumption of the $CO_2$ regeneration unit. Finally, when the $CO_2$ regeneration unit is completely switched off, the net output D can be increased by a controlled reduction in the power consumption of the $CO_2$ absorption unit and, if applicable, of a flue gas cooler. In case the $CO_2$ absorption unit 2 is not designed to run dry, i.e. it cannot be exposed to the flue gases 15 without the flow of absorbent and/or additional flue gas cooling, the flue gas bypass 11 for the $CO_2$ capture unit 2 can be opened as a function of the power available for the absorption unit.

In another exemplary approach, the net output D can be increased by a controlled and coordinated reduction in the power consumption of all components of the $CO_2$ capture unit 2 and compression unit 9. The target is to maximize the $CO_2$ capture rate at reduced power consumption. To this end, the capacity of all components can be reduced simultaneously at the same rate, and the $CO_2$ flow through all components can be the same. In consequence the power consumption can be varied as a function of the capture rate. To assure that the flow rates of different components match, a feedback from these components is required and a closed loop control is desirable. At very low capture rate, and if the $CO_2$ absorption unit 2 is not designed to run dry, e.g. it cannot be exposed to the flue gases without the flow of absorbent and/or additional flue gas cooling, the flue gas bypass for the $CO_2$ capture unit 11 has to be opened as a function of the power available for the absorption unit 2.

Figure 2:
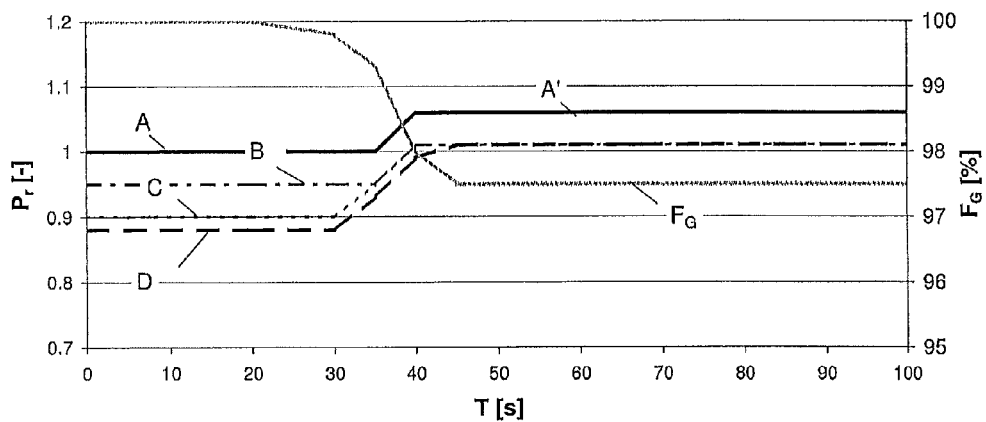
FIG. 2 schematically shows power output variations for an exemplary power plant with an exemplary flexible operation method for $CO_2$ capture and compression during an under-frequency response event.
Figure 3:
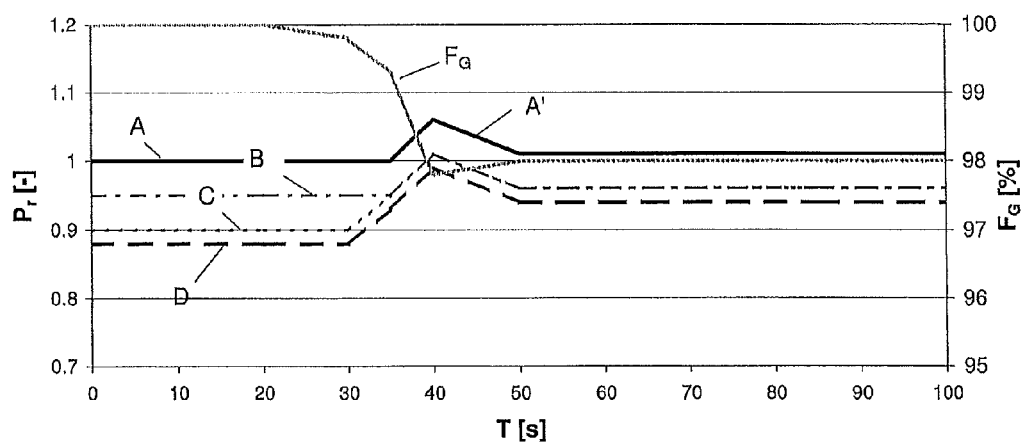
FIG. 3 schematically shows power output variations for an exemplary power plant with an exemplary flexible operation method for $CO_2$ capture and compression during an under-frequency response event, combined with a correction of the plant gross output.
Figure 4:
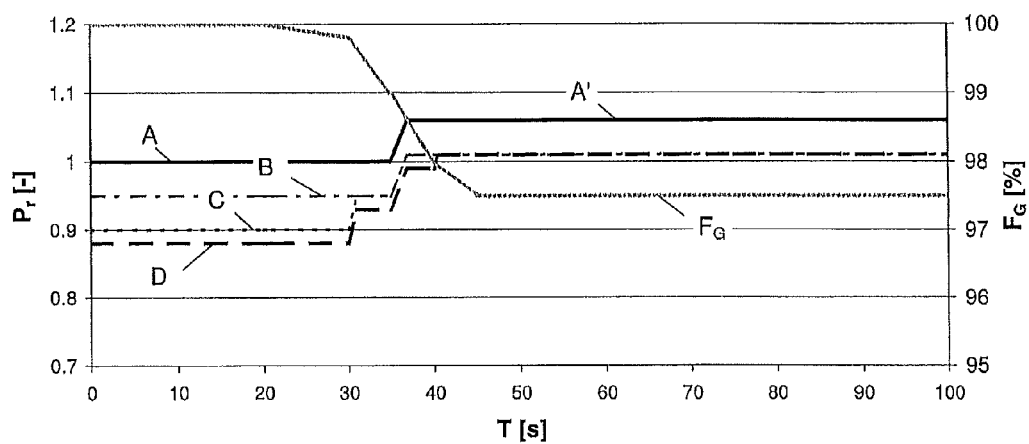
FIG. 4 schematically shows power output variations for an exemplary power plant with an exemplary flexible operation method with for $CO_2$ capture and compression during an under-frequency response event, in which additional net power requirements of the grid can be satisfied by trips of the $CO_2$ capture and compression systems.

The impact of the main power consumers of the $CO_2$ capture system on the plant power output is shown in FIGS. 2 to 4. The impact of the auxiliary power consumption of the plant itself is also indicated in these Figures.

In FIG. 2 an example for an under-frequency event with the optimized operation method of a power plant with $CO_2$ capture and compression is shown over time. At time T=0 s, the plant is in normal operation at base load with the $CO_2$ capture and compression system in operation. The impact of the plant auxiliaries and main power consumers of the $CO_2$ capture system on the plant net power output D is shown by indicating the relative output $P_r$ at different stages of the plant. All power outputs shown in this Figure are normalized by plant gross power output A at base load with steam extraction for resorption. A' is the gross output without steam extraction for resorption. B is the gross output reduced by the plant auxiliaries. C is the output after the output B is further reduced by $CO_2$ compression. D is the resulting plant net power output after C is reduced by the power consumption of the absorption. The normalized grid frequency $F_G$ is the frequency normalized with the nominal grid frequency, which is typically either 50 Hz or 60 Hz.

According to an exemplary operating method, the power reductions from B to C, and C to D as well as the gross power increase from A to A' can be used to control the net output D during an under-frequency event. In this example, the net power D can be kept constant as the normalized grid frequency $F_G$ drops from 100% to 99.8% during the time period from 20 s to 30 s because the controller has a 0.2% dead band, in which it does not react to deviations from design frequency. As the frequency continues to drop to 99.3% at time T=35 s, frequency response becomes active and the net power output D can be increased by a controlled shut down of the $CO_2$ compression between time T=30 s and T=35 s. As the normalized grid frequency $F_G$ continues to drop to 98% between T=35 s and T=40 s, the $CO_2$ regeneration cab also be shut down and no more steam is extracted for resorption. Consequently, the gross power increases from A to A' and the net power output D increases accordingly. In a final step to increase the net power output D, the $CO_2$ absorption can be shut down between times T=40 s and T=45 s and the frequency $F_G$ is stabilized at 97.5%.

In FIG. 3, a second under-frequency event with the optimized operation method of a power plant with $CO_2$ capture and compression is shown over time. At time T=0 s the plant is in normal operation at base load with the $CO_2$ capture and compression system in operation.

In this example, the normalized grid frequency $F_G$ drops from 100% to 99.8% during the time period from T=20 s to T=30 s. Due to a 0.2% dead band, no control action takes place until T=30 s. As the frequency continues to drop to 99.3% between time T=30 s and T=35 s, the net power output D can be increased by a controlled shut down of the $CO_2$ compression as frequency response. Since the normalized grid frequency $F_G$ continues to drop to 97.8% between T=35 s and T=40 s, the $CO_2$ regeneration can also be shut down and no more steam is extracted for resorption. Consequently, the gross power increases from A to A' and the net power output D increases accordingly. Between time T=40 s and T=45 s, the normalized grid frequency $F_G$ recovers to 98% and the net power D can be reduced by a reduction of gross power A', to meet the grid net power requirements corresponding to the under-frequency. At the same time the normalized grid frequency $F_G$ stabilizes at 98%.

FIG. 4 shows a third example for power output variations of a power plant with a flexible operation method for $CO_2$ capture and compression during an under-frequency response event. In this example, the additional net power requirements of the grid can be met by sudden shut downs or trips of the $CO_2$ capture and compression system's components.

Again, at time T=0 s the plant is in normal operation at base load with the $CO_2$ capture and compression system in operation. The impact of the plant auxiliaries and main power consumers of the $CO_2$ capture system on the net plant power output D is shown by indicating the relative output $P_r$ at different stages of the plant. All power outputs shown in this Figure are normalized by plant gross power output A at base load with steam extraction for resorption. A' is the gross output without steam extraction for resorption. B is the gross output reduced by the plant auxiliaries. C is the output after the output B is further reduced by $CO_2$ compression. D is the resulting plant net power output after D is reduced by the power consumption of the absorption.

As in the earlier examples, a 0.2% dead band can be assumed and the net power D can be kept constant as the normalized grid frequency $F_G$ drops from 100% to 99.8% during the time period from T=20 s to T=30 s. Once the frequency deviation exceeds 0.2%, frequency response becomes active and the net power D can be increased by a sudden shut down or trip of the $CO_2$ compression at time T=30 s. No further control action takes place while the frequency $F_G$ continues to drop to 99% at time T=35 s. As the normalized grid frequency $F_G$ continues to drop below 99%, the $CO_2$ regeneration can also be tripped and no more steam is extracted for resorption. Consequently, the gross power increases from A to A' and the net power output D increases accordingly. No further control action takes place while the frequency $F_G$ continues to drop to 98% between T=35 s and T=40 s. In a final step to increase the net power output E, the $CO_2$ absorption can be tripped once the net frequency drops below 98% at T=40 s. The net frequency $F_G$ further drops to 97.5% where it stabilizes.

Exemplary embodiments described above and in the drawings disclose embodiments, which differ from the exemplary embodiments and which are contained in the scope of the disclosure.

For example, the power used for recompression of flue gasses, as used in case of cryogenic $CO_2$ separation or in case of absorption on elevated pressure levels can be saved or reduced during times of high power demand. Or, in case of $CO_2$ separation with chilled ammonia, the cooling power can be saved or reduced during an under-frequency event. Further, a method and a corresponding plant without $CO_2$ compression can be utilized.

In the examples given here, no time delay between drop of grid frequency and control action is indicated. Depending on the speed of measurements, signal transmission and controller, there can be a noticeable time delay, which can be in the order of seconds.

Further, in a gas turbine based power plant or combined power plant, any under-frequency event can lead to a reduction of the gas turbine gross power output, if no countermeasures are taken. An over firing, that is an increase of the hot gas temperature beyond the design temperatures, can be carried out for frequency response in gas turbines. The standard measures for frequency response can be combined with the features described for power plants with $CO_2$ capture and compression.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Power Plant
2 $CO_2$ capture unit
3 Air
4 Fuel
6 return line
7 Electric power for $CO_2$ capture unit
8 Electric power for $CO_2$ compression unit
9 $CO_2$ compression
10 Compressed $CO_2$
11 Flue gas bypass for $CO_2$ capture unit
12 $CO_2$ compression unit bypass
13 Steam to $CO_2$ capture unit
14 Steam control valve
15 Flue gas to $CO_2$ capture unit
16 $CO_2$ depleted flue gas
17 Electric power for plant auxiliary excluding $CO_2$ capture and compression
18 Control system
19 Control signal exchange with $CO_2$ capture unit and flue gas bypass
20 Control signal exchange with regeneration unit (if applicable)
21 Control signal exchange with absorbent/adsorbent storage system (if applicable)
22 Plant control signals exchange as for conventional plant without $CO_2$ capture including gross and net power
23 Control signal exchange with $CO_2$ compression unit and compressor bypass
24 Control signal exchange to steam control valve—directly from control system or via the regeneration unit (if applicable)
A Plant gross power output with steam extraction for $CO_2$ resorption
A' Plant gross power output without steam extraction for $CO_2$ resorption
B A reduced by plant auxiliaries without $CO_2$ capture and compression
C B reduced by power requirements for $CO_2$ compression—varied depending on grid power demand.
D $CO_2$ capture plant net power output (C reduced by power requirements for absorption—varied depending on grid power demand).
$F_G$ normalized Grid frequency

What is claimed is:

1. A method for operating a power plant, comprising:
operating a plant via a control system and $CO_2$ capture system; and
using a power consumption of the $CO_2$ capture system as a control parameter for controlling a net power output during an under-frequency event.

2. A method according to claim 1, comprising:
operating the $CO_2$ capture system at reduced capacity or shutting down the $CO_2$ capture system in order to supply additional power to the grid; and
using the additional power to meet frequency response requirements of a power grid during an under-frequency event.

3. A method according to claim 1, comprising:
operating the power plant close to or at base load when the $CO_2$ capture system is in operation; and
making the power consumption of the $CO_2$ capture system available for frequency response of the plant.

4. A method according to claim 1, comprising:
varying the $CO_2$ capture rate to control the power consumption of the $CO_2$ capture system during an under-frequency event.

5. A method according to claim 1, wherein the $CO_2$ capture system includes a $CO_2$ compression unit, the method comprising:
shutting down the $CO_2$ compression unit or operating the $CO_2$ compression unit at reduced capacity during an under-frequency event.

6. A method according to claim 5, comprising:
releasing that part or all of the captured $CO_2$ via a bypass of the $CO_2$ compression unit during an under-frequency event.

7. A method according to claim 1, wherein the $CO_2$ capture system includes a regeneration unit, the method comprising:
shutting down the regeneration unit or operating the regeneration unit at reduced capacity during an under-frequency event.

8. A method according to claim 1, wherein the $CO_2$ capture system includes an absorption or adsorption unit, the method comprising:

shutting down the absorption or adsorption unit or operating the absorption or adsorption unit at reduced capacity during an under-frequency event.

9. A method according to claim 8, comprising:

bypassing at least part of the flue gas around the capture equipment during an under-frequency event.

10. A method according to claim 7, comprising:

reducing steam consumption of the regeneration unit in the capture system due to the shut down or operation at reduced capacity; and feeding surplus steam to an existing steam turbine of the plant for additional power generation during an under-frequency event.

11. A method according to claim 10, comprising:

using a stored absorbent or adsorbent for $CO_2$ capture during an under-frequency event when regeneration is shut down or regeneration of absorbent or adsorbent takes place at a reduced capacity during the under-frequency event.

12. A method according to claim 1, comprising:

controlling the $CO_2$ capture system by a closed loop control system, which is integrated into the plant control system or coordinated by the plant control system or has a direct data link to the plant control system.

13. A power plant comprising:

a $CO_2$ capture system; and a control system configured to control a net power output during an under-frequency event by employing a power consumption of the $CO_2$ capture system as a control parameter.

14. A power plant according to claim 13, comprising:

at least one steam turbine for converting a maximum steam flow into energy, which can be produced by the plant with the $CO_2$ capture system switched off.

15. A power plant according to claim 13, comprising:

at least one generator and electrical system for converting a maximum power, which is produced with the $CO_2$ capture system off, into electrical power and to transmit this electric power to a grid.

16. A power plant according to claim 13, comprising:

at least one of a bypass of the $CO_2$ compression unit and an absorption unit.

17. A power plant according to claim 16, wherein the absorption unit is configured to withstand the flue gases even when it is not in operation.

18. A power plant according to claim 14, comprising:

at least one generator and electrical system for converting a maximum power, which is produced with the $CO_2$ capture system off, into electrical power and to transmit this electric power to a grid.

19. A power plant according to claim 14, comprising:

at least one of a bypass of the $CO_2$ compression unit and an absorption unit.

20. A power plant according to claim 14, wherein the absorption unit is configured to withstand the flue gases even when it is not in operation.

* * * * *